United States Patent [19]

Okulicz et al.

[11] Patent Number: 4,487,364
[45] Date of Patent: Dec. 11, 1984

[54] ARRANGEMENT FOR HEATING THE OPERATOR'S CABIN OF A MACHINE DRIVEN BY AN INTERNAL COMBUSTION ENGINE

[75] Inventors: Conrad Okulicz, Dusseldorf; Achim Z. Nieden, Cologne, both of Fed. Rep. of Germany

[73] Assignee: Klöckner-Humboldt-Deutz AG, Cologne, Fed. Rep. of Germany

[21] Appl. No.: 452,928

[22] Filed: Dec. 27, 1982

[51] Int. Cl.³ .............................................. B60H 1/02
[52] U.S. Cl. ....................... 237/12.3 R; 123/196 AB; 122/26; 126/247
[58] Field of Search ......................... 237/1 R, 12.3 R; 123/196 AB; 122/26; 126/247

[56] References Cited

U.S. PATENT DOCUMENTS 4,136,824  1/1979  Kallenback ................... 237/12.3 R
4,245,593  1/1981  Stein ......................... 123/196 AB X
4,352,455  10/1982 Moser et al. ...................... 122/26

Primary Examiner—Henry Bennett
Attorney, Agent, or Firm—Watson, Cole, Grindle & Watson

[57] ABSTRACT

An arrangement for heating the operator's cabin of a machine driven by an internal combustion engine utilizes the engine oil as a heating medium as it is pressurized by a hydraulic pump and is elevated in temperature as it passes through a throttling element. To accelerate the heating of the internal combustion engine, the return line from the space heat exchanger into which the heated engine oil flows is located upstream of the engine lubricating points. To increase the heat supply to a portion of the engine oil, the hydraulic pump located downstream of the lubricating-oil feed pump suctions away, for the purpose of limiting the flow, some of the engine oil flowing through the main oil distribution system of the engine.

21 Claims, 4 Drawing Figures

ARRANGEMENT FOR HEATING THE OPERATOR'S CABIN OF A MACHINE DRIVEN BY AN INTERNAL COMBUSTION ENGINE

BACKGROUND OF THE INVENTION

This invention relates generally to an arrangement for heating the operator's cabin of a machine driven by an internal combustion engine, more particularly the driver's cabin of a motor vehicle, and includes a hydraulic pump driven by the engine for withdrawing engine oil from the lubricating- or cooling-oil system of the engine, a heating system connected into the oil distribution system and including a throttling element downstream of the hydraulic pump for increasing the temperature of the engine oil passing therethrough, an oil/air heat exchanger located in the operator's cabin and coupled into the heating system downstream of the throttling element, and an adjustable control element for controlling flow of the engine oil to the heat exchanger or through a line by-passing the heat exchanger. Such a heating arrangement is of particular advantage in air-cooled internal combustion engines.

U.S. Pat. No. 4,352,455 (Moser et al), dated Oct. 5, 1982, and commonly owned herewith, discloses a heating arrangement generally of the aforedescribed type in which the lubrication- or cooling-oil circuit and the heating circuit are completely separated at least from the intake side of the hydraulic pump. Thus, although slightly heated engine oil is available in the heating system heat exchanger when the engine starts operating, a desireable higher temperature is not established at the lubricating points of the internal combustion engine until the entire lubricating oil supply has been gradually heated. In this prior heating arrangement, a partial quantity of the lubricating oil supply must effect an accelerated rise in temperature in the heating system heat exchanger through repeated throttling. However, since the oil is heated only gradually it may prove detrimental to the oil distributing points. Moreover, a special control element is required for regulating this repeatedly throttled partial quantity of oil.

SUMMARY OF THE INVENTION

It is therefore an object of the present invention to provide a heating arrangement which is readily adaptable to existing lubricating oil systems, and which selectively or simultaneously enables the heating system heat exchanger and the lubricating points of the internal combustion engine to benefit as much as possible from the increase in temperature induced by throttling.

Another object of the invention is to provide such a heating arrangement wherein a greater extent of a partial quantity of the lubricating oil may be heated, whereby the magnitude of this partial quantity is regulated automatically while at the same time avoiding the need for a special control element.

A further object of this invention is to provide such a heating arrangement wherein the heating system is connected in series with the lubricating- and cooling-oil distribution system, and a return line leading from the heat exchanger is connected into the distribution system at a junction point upstream of the oil distributing points for immediately heating the oil fed components of the engine through such oil distributing points.

A still further object of this invention is to provide such a heating arrangement wherein an intake line leads into the hydraulic pump and is connected into the distribution system at a take-off point downstream of the feed pump, provided for pumping oil from the engine oil sump through pressurized lines of the distribution system, for automatically withdrawing oil from the distribution system for the heating system without the need for a special control element.

Other objects, advantages and novel features of the invention will become more apparent from the following detailed description of the invention when taken in conjunction with the accompanying drawings.

DETAILED DESCRIPTION OF THE INVENTION

Figure 1:
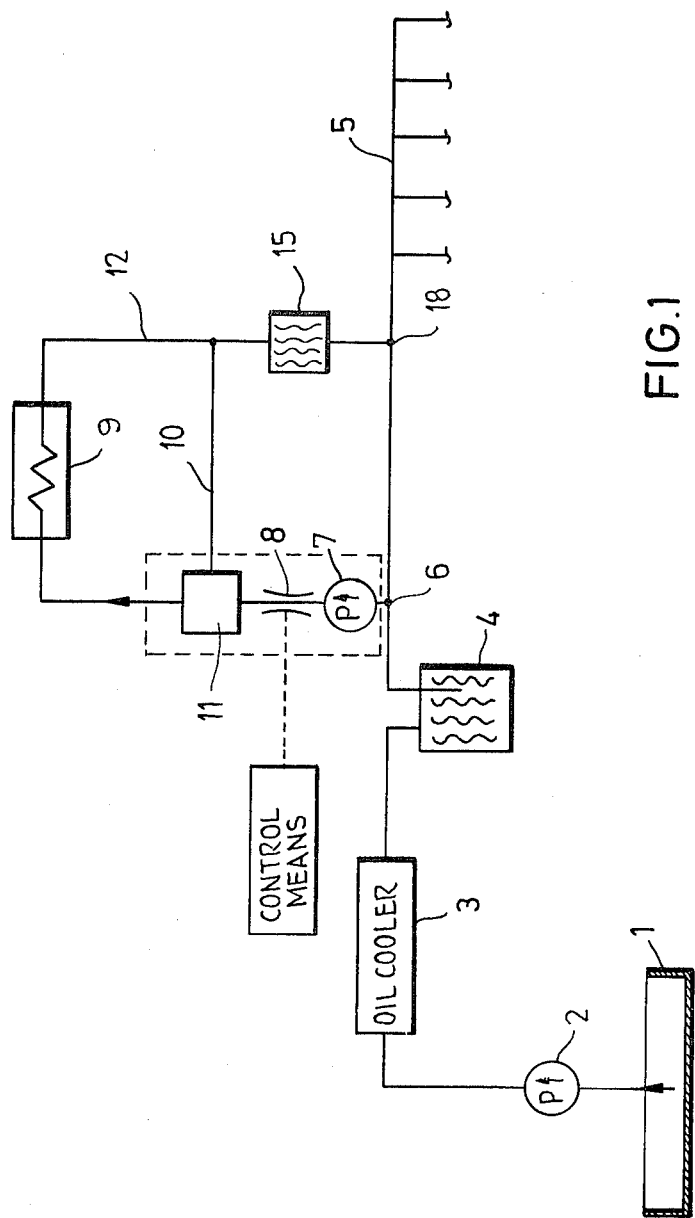
FIGS. 1, 2, 3 and 4 are diagrammatic illustrations of several heating arrangement embodiments according to the invention which differ in regard to the branching points and junctions between the series-connected lubrication and heating systems.

In the various embodiments, like parts will be identified by the same reference numerals. In the drawings, an engine oil sump 1 of an internal combustion engine supplies engine oil for the lubricating- and cooling-oil distribution system of the engine which includes a hydraulic feed pump 2 for pumping oil from the sump through pressurized lines of the system for delivering lubricating oil to lubricating oil supply points 5 of the internal combustion engine via a lubricating-oil cooler 3 and a lubricating-oil filter 4. A standard type oil/air heat exchanger may function as the oil cooler when the air heated by feed pump 2 is discharged to the exterior of the occupant's cabin.

A take-off point 6 in the lubricating-and cooling-oil system has the intake side of a hydraulic pump 7 connected thereto for withdrawing engine oil from the distribution system and pumping the engine oil through the heating system of which pump 7 forms a part. Hydraulic pump 7 is typically permanently coupled to the internal combustion engine and is, for example, mounted on an auxiliary output drive. A variable drive is also possible, but is usually too costly. A throttling element 8 is connected downstream of pump 7 for reducing the pressure and elevating the temperature of the engine oil passing therethrough, as in any normal manner.

Figure 2:
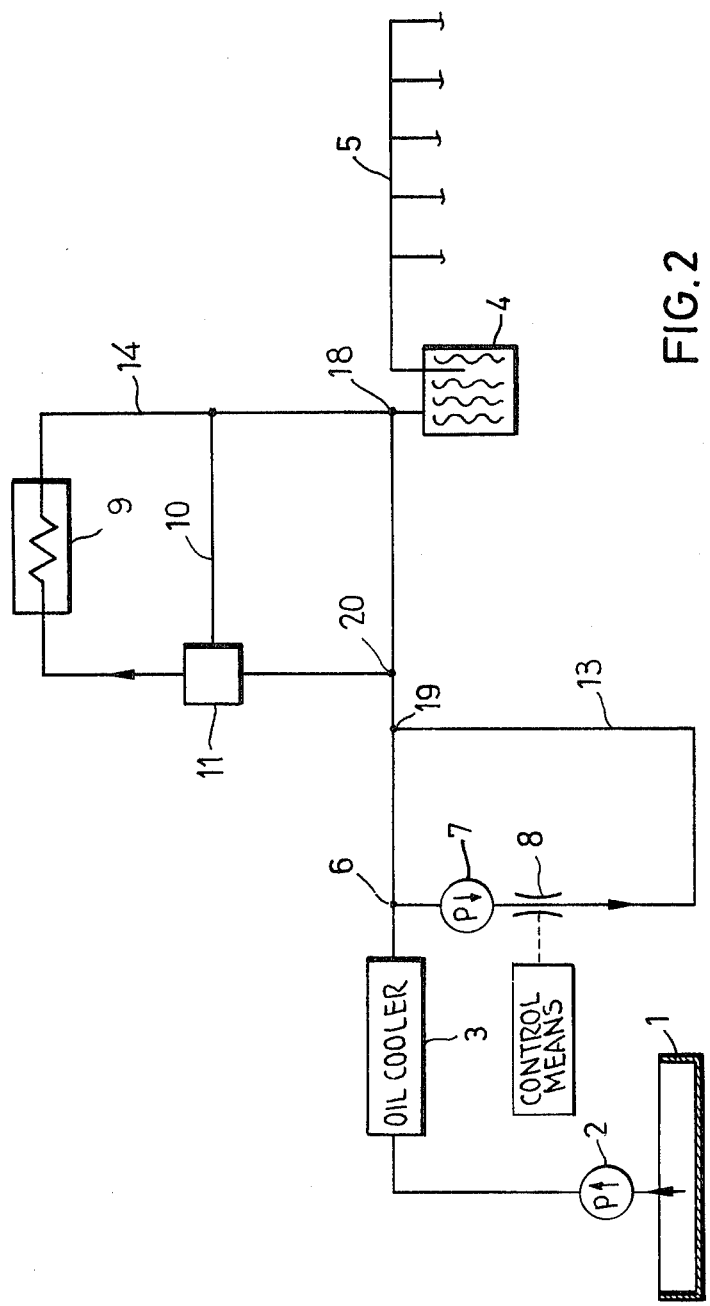
Figure 3:
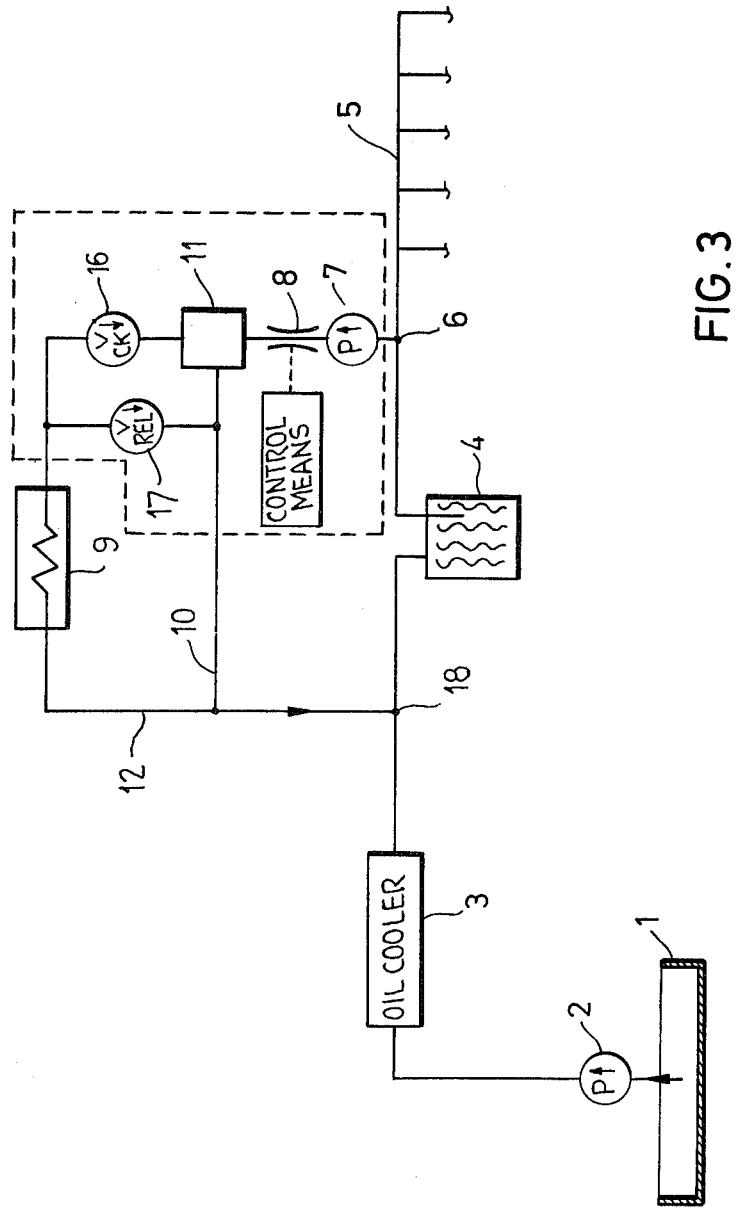
Figure 4:
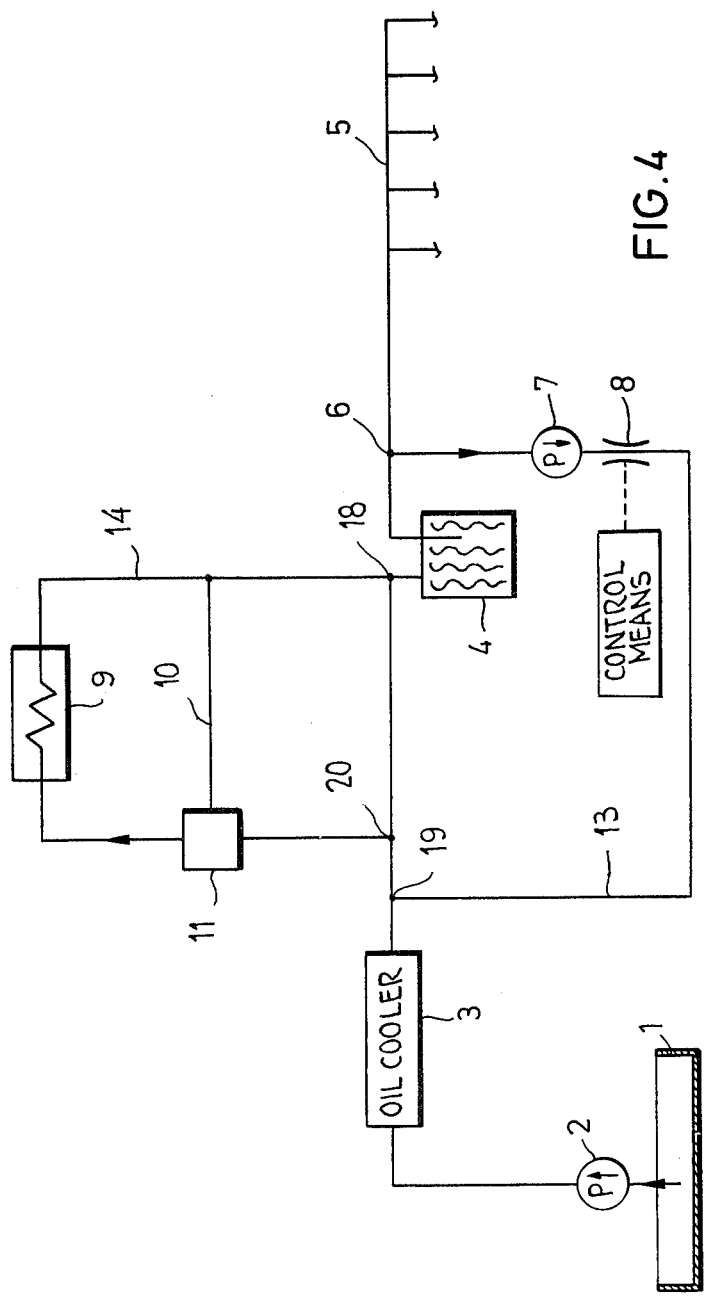

A heating system air/oil heat exchanger 9 is located downstream of the throttling element for supplying heat to the operator's cabin, a by-pass line 10 is provided for by-passing the heat exchanger, and an adjustable control element 11 is provided for selectively controlling flow of the engine oil to the heat exchanger or through the by-pass line for regulating the amount of heated oil supplied to the heat exchanger. In FIGS. 1 and 3, pump 7, throttling element 8, heat exchanger 9, and control element 11 are series-connected into a first, looped pressure line 12. In FIGS. 2 and 4, hydraulic pump 7 and throttling element 8 may be series-connected into a second looped hydraulic pressure line 13, and heat exchanger 9 and control element 11 may be series-connected into a third looped hyraulic pressure line 14.

The lubricating oil discharged from heat exchanger 9 or from by-pass line 10 can be filtered solely, or additionally, in an auxiliary filter 15 shown in FIG. 1, and applicable likewise to the FIG. 3 embodiment, and located in looped line 12. And, as shown in FIG. 3, a check valve 16 may be provided upstream of the heat exchanger to prevent leakages beyond control element, 11 when by-pass line 10 is open. Also, heat exchanger 9 can be protected by a pressure relief valve 17 against overpressure when by-pass line 10 is closed.

In each of the embodiments, a return line leading from the heat exchanger is connected into the oil distribution system at a junction point 18. Between this junction point and take-off point 6 there is usually a return flow.

Since, in FIGS. 2 and 4, the heating system is represented by two looped lines 13 and 14, looped line 13 containing the hydraulic pump 7 and throttling element 8 has a return line which is connected into the distribution system at a hot-oil return junction 19. And, looped line 14 containing heat exchanger 9 has a hot-oil take-off point 20 which is normally located downstream of hot-oil return junction 19 in the lubricating- and cooling-oil distribution system. The cross-sections of the first, second and third looped lines of the disclosed embodiments, particularly when dividing the heating system into two looped lines 13 and 14, are such as to ensure adequate flow to heat exchanger 9. In the FIGS. 2 and 4 embodiments, the direct connection between hot-oil take-off point 20 and junction point 18 in the lubricating- and cooling-oil distribution system can, under certain conditions, be eliminated. However, such connection would not be eliminated if the present heating arrangement is to be adapted to an existing internal combustion engine.

It can be seen that lubricating-oil cooler 3 is located upstream of looped lines 12, 13 and 14 of the heating systems for the several disclosed embodiments, and that take-off point 6 and/or junction 18 and/or hot-oil return junction 9 and/or hot-oil take-off point 20, are disposed between cooler 3 and lubricating points 5 of the internal combustion engine. In such manner, excellent re-equipment possibilities for existing internal combustion engines result with the presently designed heating arrangement.

Regardless of the location of the intake side of pump 7 relative to the distribution system, it is quite advantageous, with respect to the wear of the internal combustion engine, to connect the return line from heat exchanger 9 into the lubrication system upstream of lubricating points 5. Accordingly, when the heat exchanger is pressurized, and particularly when it is being by-passed, heated lubricated oil immediately reaches lubricating points 5 via the bleed-off heating system, so that the components pressurized by injection oil nozzles, particularly the pistons, are cooled less than usual so that they reach their operating temperature more rapidly.

Other advantages according to the invention can be realized by connecting the intake side of hydraulic pump 7 to the lubricating- and cooling-oil distribution system downstream of lubrication-oil feed pump 2. In essence, it is immaterial whether take-off point 6 of hydraulic pump 7 lies upstream or downstream of junction point 18 in relation to heat exchanger 9 in the oil distribution system.

A return flow also occurs in looped lines 12, 13 and 14 arranged in a direction parallel to the direction of the main flow and at a section of the distribution system located between points at which the heating system is tapped into the lubrication system, assuming that the motor displacement of the internal combustion engine is less than the output of hydraulic pump 7. Thus, in each of the disclosed embodiments, as particularly apparent in FIGS. 3 and 4, a short-circuiting current flow arises, the volume of which is regulated automatically, and which contributes to the accelerated rise in temperature both in exchanger 9 and at oil distributing points 5 of the internal combustion engine.

There are very favorable possibilities for adapting the heating arrangement according to the invention to existing internal combustion engines, because the looped lines of the heating system are connected at locations where portions of the distribution system exit from the housing of the internal combustion engine for connection with external units. For example, the connection points of the heating system are located between the lubricating points of the internal combustion engine and lubricating-oil cooler 3, as well as between lubricating-oil points 5 and lubricating-oil filter 4, as in FIG. 1. No such connection points are located between filter 4 and lubricating-oil points 5 in the FIG. 2 arrangement, and only take-off point 6 is located therebetween in the FIGS. 3 and 4 embodiments.

The connections between the heating and distribution systems of the present heating arrangement can be, as shown by the various embodiments, differently located to provide various arrangements. Of particular advantage are arrangements in which the lubricating oil fed to heat exchanger 9 is filtered before reaching the heat exchanger and, especially in the case of a multiple circulation, is filtered repeatedly in the looped line.

Control element 11 can be located either at the flow divider as shown in the drawings, or in by-pass line 10. The control element may comprise a thermostatic valve for controlling the flow of the engine oil to the heat exchanger or through the by-pass line depending on the heating requirements of the heating system to fulfill the needs of the operator's cabin. Otherwise, such valve adjusts thermostatically in relation to changes in lubricating-oil temperature or in the ambient temperature used as a controlled variable. The control element may otherwise control the switching arrangement for switching the flow on and off to the heat exchanger, independent of temperature. Or, the control element may be in the form of a pressure valve for switching the flow through by-pass line 10 when the oil pressure upstream of the valve falls below a predetermined minimum, so as to thereby insure an appropriate lubricating oil pressure of the internal combustion engine. Furthermore, heat exchanger 9 could function as an oil cooler by simply discharging the heated air leaving the heat exchanger to the exterior of the occupant's cabin.

The throttling through element 8 must be stopped when a maximum lubricating-oil temperature is attained such as during operation of a continuous hydraulic pump drive, especially at high ambient temperatures. This can be effected by the provision of various throttle control means. For example, the throttling element may comprise an adjustable valve, may have a variable cross-section, or may have an internal controllable by-pass. The control of the throttle cross-section or of such internal by-pass can be carried out by means of a pilot-operated pressure-upkeep valve capable of being controlled as a function of the engine temperature, the engine oil viscosity, the load of the engine or the operating condition of the vehicle. Thus, the control can be effected by means of a magnetic valve which can be controlled by a pilot unit.

A common housing may be provided for pump 7, throttling element 8 and control element 11, as shown in dashed outline in FIG. 1. Also, a common housing may be provided for pump 7, element 8, element 11, and valves 16, 17, in any usual manner, as shown in dashed outline in FIG. 3.

Obviously, many other modifications and variations of the present invention are made possible in the light of the above teachings. For example, control element 11 and throttling element 8 may be arranged at different locations in the heating system loops without departing from the invention. It is therefore to be unsersood that within the scope of the appended claims the invention may be practiced otherwise than as specifically described.

What is claimed is:

1. An arrangement for heating the operator's cabin of a machine driven by an internal combustion engine, comprising a lubricating- and cooling-oil distribution system of the engine having oil distribution points, said system including a first hydraulic pump for pumping oil from the engine oil sump through pressurized lines of said system, a heating system connected in series with said distribution system and including a second hydraulic pump driven by the engine for withdrawing engine oil from said distribution system and pumping the engine oil through said heating system, an intake line leading into said second pump and being connected to said distribution system at a take-off point downstream of said first pump, a throttling element in said heating system downstream of said second pump for reducing the pressure and elevating the temperature of the engine oil passing therethrough, a space heat exchanger in said heating system downstream of said throttling element for supplying heat to the operator's cabin, a by-pass line in said heating system by-passing said heat exchanger, an adjustable control element for selectively controlling the flow of heated oil downstream from said throttling element to said heat exchanger or through said by-pass line depending on the heating requirements of said heating system, a return line leading from said heat exchanger and connected into said distribution system at a junction point upstream of said oil distributing points and upstream of said take-off point, whereby the oil fed components of the engine are immediately heated through said oil distributing points.

2. The arrangement according to claim 1, wherein said take-off point lies upstream, in the direction of flow through said distribution system, of said junction point.

3. The arrangement according to claim 1, wherein said take-off point lies downstream, in the direction of flow through said distribution system, of said junction point.

4. The arrangement according to claim 1, wherein said heating system includes a first, looped pressure line extending between said take-off and junction points, said second pump, said throttling element and said heat exchanger being series-connected into said first looped line.

5. The arrangement according to claim 1, wherein said heating system includes a second, looped pressure line, said second pump and said throttling element being coupled into said second looped line, a return line leading from said throttling element and being connected into said distribution system at a hot-oil return junction upstream of said junction point, said heating system further including a third, looped pressure line having a take-off point at said distribution system, said heat exchanger and said control element being coupled into said third looped line, said take-off point of said third looped line lying upstream of said junction point.

6. The arrangement according to claim 1, wherein said distribution system includes a lubricating-oil filter disposed directly upstream of said take-off point, and said take-off point being located between said filter and said oil distributing points.

7. The arrangement according to claim 6, wherein said filter is disposed directly downstream of said junction point.

8. The arrangement according to claim 1, wherein said distribution system includes a lubricating-oil filter disposed directly downstream of said junction point.

9. The arrangement according to claim 8, wherein said take-off point is located between said filter and said oil distributing points.

10. The arrangement according to claim 4, wherein said distribution system includes a lubricating-oil cooler located upstream of said first looped line, said take-off and junction points being located between said cooler and said oil distributing points.

11. The arrangement according to claim 5, wherein said distribution system includes a lubricating-oil cooler located upstream of said second and third looped lines, said take-off points as well as said return junction and said junction point being located between said cooler and said oil distributing points.

12. The arrangement according to claim 1, wherein said control element comprises a thermostatic valve for controlling the flow of the engine oil to said heat exchanger or through said by-pass line depending on the heating requirements of said heating system.

13. The arrangement according to claim 1, wherein said control element comprises a switching arrangement for switching the flow on and off to said heat exchanger.

14. The arrangement according to claim 1, wherein said control element comprises a pressure valve for switching the flow through said by-pass line when the oil pressure upstream of said valve falls below a predetermined minimum.

15. The arrangement according to claim 1, wherein said throttling element comprises an adjustable valve.

16. The arrangement according to claim 1, wherein said throttling element includes an internal controllable by-pass.

17. The arrangement according to claim 1, wherein said throttling element comprises a pilot-operated pressure-upkeep valve capable of being controlled as a function of one of the engine temperature, the engine oil viscosity, the load of the engine and the operating condition of the vehicle.

18. The arrangement according to claim 1, wherein said heating system includes a check valve located between said control element and said heat exchanger to prevent any leakage of oil flow to said heat exchanger when said by-pass line is open.

19. The arrangement according to claim 18, wherein said heating system includes a pressure-relief valve upstream of said heat exchanger to protect said heat exchanger against over-pressure when said by-pass line is closed.

20. The arrangement according to claim 1, wherein a common housing is provided for said second pump, said throttling element and said control element.

21. The arrangement according to claim 19, wherein a common housing is provided for said second pump, said throttling element, said control element, said check valve and said pressure-relief valve.

* * * * *